US007215673B2

(12) United States Patent
Kosonen et al.

(10) Patent No.: US 7,215,673 B2
(45) Date of Patent: May 8, 2007

(54) MULTIPLEXING AND DEMULTIPLEXING METHOD AND APPARATUS

(75) Inventors: Mika Kosonen, Espoo (FI); Janne Tuomisto, Helsinki (FI)

(73) Assignee: Nokia Corporation, Espoo (FI)

(*) Notice: Subject to any disclaimer, the term of this patent is extended or adjusted under 35 U.S.C. 154(b) by 906 days.

(21) Appl. No.: 10/006,921

(22) Filed: Dec. 3, 2001

(65) Prior Publication Data

US 2002/0097735 A1 Jul. 25, 2002

Related U.S. Application Data

(63) Continuation of application No. PCT/EP99/04215, filed on Jun. 17, 1999.

(51) Int. Cl.
*H04L 12/28* (2006.01)
*H04J 3/26* (2006.01)

(52) U.S. Cl. .................... 370/395.1; 370/413; 370/535

(58) Field of Classification Search ............. 370/395.1, 370/395.6, 395.7, 395.71, 412–413, 419, 370/469, 535, 536

See application file for complete search history.

(56) References Cited

U.S. PATENT DOCUMENTS

| | | | | |
|---|---|---|---|---|
| 5,485,456 | A | 1/1996 | Shtayer et al. | |
| 5,500,939 | A * | 3/1996 | Kurihara | 345/537 |
| 5,521,918 | A * | 5/1996 | Kim | 370/428 |
| 6,032,205 | A * | 2/2000 | Ogimoto et al. | 710/33 |
| 6,147,997 | A * | 11/2000 | Holden et al. | 370/395.1 |
| 6,266,748 | B1 * | 7/2001 | Bishop | 711/158 |
| 6,307,858 | B1 * | 10/2001 | Mizukoshi et al. | 370/395.71 |
| 6,345,052 | B1 * | 2/2002 | Tse et al. | 370/395.6 |
| 6,356,557 | B1 * | 3/2002 | Nichols et al. | 370/449 |
| 6,430,197 | B1 * | 8/2002 | Park | 370/471 |
| 6,611,523 | B2 * | 8/2003 | Tanaka et al. | 370/395.5 |
| 6,751,233 | B1 * | 6/2004 | Hann | 370/466 |
| 6,850,523 | B1 * | 2/2005 | Karr et al. | 370/395.21 |
| 6,909,727 | B1 * | 6/2005 | Shaffer et al. | 370/516 |
| 6,967,962 | B1 * | 11/2005 | Medina et al. | 370/413 |
| 6,985,503 | B1 * | 1/2006 | DeGrandpre et al. | 370/536 |
| 2003/0086429 | A1 * | 5/2003 | Yamanaka | 370/395.3 |

FOREIGN PATENT DOCUMENTS

| | | |
|---|---|---|
| WO | 9820638 | 5/1998 |

* cited by examiner

*Primary Examiner*—Doris H. To
*Assistant Examiner*—Ahmed Elallam
(74) *Attorney, Agent, or Firm*—Ware, Fressola, Van Der Sluys & Adolphson, LLP

(57) ABSTRACT

The invention relates to a multiplexing and demultiplexing method and apparatus, wherein a transmission of input data from one or a plurality of input buffers to a plurality of or one output buffer, respectively, is released when all of the plurality of or the one output buffer is capable of receiving data. Thus, a plurality of devices can be connected to another device using only one address. The plurality of devices may then decide themselves whether the data belongs to them or not. In one direction, the data is broadcasted to all of the plurality of devices and, in the other direction, one of the plurality of devices can transmit data at a time. Accordingly, interface addresses can be saved in case the number of addresses is not enough for all of the plurality of devices.

28 Claims, 3 Drawing Sheets

MULTIPLEXING AND DEMULTIPLEXING METHOD AND APPARATUS

CROSS-REFERENCE TO RELATED APPLICATION

This application is a continuation of International Application PCT/EP99/04215 having an international filing date of Jun. 17, 1999 and from which priority is claimed under all applicable sections of Title 35 of the United States Code including, but not limited to, Sections 120, 363 and 365 (c).

FIELD OF THE INVENTION

The present invention relates to a multiplexing and demultiplexing method and apparatus to be used in a data network such as an ATM (Asynchronous Transfer Mode) network.

BACKGROUND OF THE INVENTION

ATM is a transfer mode in which information is organized into cells. It is asynchronous in the sense that the recurrence of cells containing information from an individual user is not necessarily periodic. ATM is a layered architecture allowing multiple services like voice, data and video to be mixed over the network.

It is desirable that a common interface between the lowest physical layer (PHY) and upper layer modules such as the ATM layer is defined, to thereby allow a common PHY interface in ATM subsystems across a wide range of speeds and media types.

In many cases, an arrangement is provided, where a plurality of PHY devices are connected via the PHY interface to a single ATM device. Thus, an address has to be allocated to the PHY devices, which is used by the higher layer device in order to individually access one of the PHY devices in order to perform a data transfer. However, the number of available addresses according to the PHY interface specification may not be large enough to support a desired number of physical devices.

Although conversion circuits such as multiplexer/demultiplexer (MUX/DEMUX) circuits are known to connect a plurality of non-addressable PHY devices to a higher layer device, these circuits are not suitable for overcoming the above problem, because they also demand a respective address for each of the non-addressable PHY devices.

SUMMARY OF THE INVENTION

It is therefore an object of the present invention, to provide a multiplexing and demultiplexing method and apparatus, by means of which the number of PHY devices connectable via a PHY interface can be increased without increasing the required number of addresses.

This object is achieved by a multiplexing method for supplying input data received from one of a plurality of input channels to an output channel, comprising the steps of:

providing a plurality of input buffers respectively connected to the plurality of input channels, and an output buffer connected to the output channel;

storing the received input data in a respective one of the plurality of input buffers; and releasing transmission of the input data from the respective one of the plurality of input buffers to the output buffer, when the output buffer is capable of receiving data.

Furthermore, the above object is achieved by a demultiplexing method for supplying input data received from an input channel to a plurality of output channels, comprising the steps of:

providing an input buffer connected to the input channel and a plurality of output buffers respectively connected to the plurality of output channels;

storing the input data in the input buffer; and releasing transmission of the input data from the input buffer to the plurality of output buffers, when all of the plurality of output buffers are capable of receiving data.

Additionally, the above object is achieved by a multiplexing apparatus for supplying input data received from one of a plurality of input channels of the multiplexing apparatus to an output channel thereof, comprising:

a plurality of input buffer means respectively connected to the plurality of input channels, wherein the input data is stored in a respective one of the plurality of input buffer means;

output buffer means connected to the output channel; and control means for releasing a transmission from the respective one of the plurality of input buffer means to the output buffer means, when the output buffer means is capable of receiving data.

Moreover, the above object is achieved by a demultiplexing apparatus for supplying input data received from an input channel of the demultiplexing apparatus to a plurality of output channels thereof, comprising:

input buffer means for storing the input data;

a plurality of output buffer means respectively connected to the plurality of output channels; and control means for releasing a transmission from the input buffer means to the plurality of output buffer means, when all of the plurality of output buffer means are capable of receiving data.

Accordingly, all physical devices can be placed behind a single interface address and receive the same data. Then, the PHY devices may decide themselves whether the received data belongs to them or not. In one direction (demultiplexing), the data is broadcasted to all PHY devices, while, in the other direction (multiplexing), one PHY device may individually transmit its data at a time.

Accordingly, no further interface addresses are required for the PHY devices connected via a multiplexer/demultiplexer according to the present invention.

Preferably, the input and output buffers can be First-In-First-Out (FIFO) buffers, so that a plurality of data packets can be received and their order maintained.

The plurality of input channels can be connected to a plurality of PHY devices having the same interface address allocated. Thus, even the number of addresses of the PHY devices as such can be reduced, since they are connected to the upper layer network via the multiplexer/demultiplexer according to the present invention, which does not require any addresses for performing the multiplexing/demultiplexing operation.

In particular, the PHY devices may be UTOPIA (Universal Test & Operations PHY Interface for ATM) level 1 compliant. Thus, the multiplexer/demultiplexer according to the present invention can be used as a converter between a UTOPIA Layer 1 interface and a UTOPIA Layer 2 interface, such that non-addressable Layer 1 PHY devices can be connected to an Layer 2 device. In this case, the output channel may be connected to an ATM device compliant to the UTOPIA level 1 or level 2 interface specifications.

BRIEF DESCRIPTION OF THE DRAWINGS

In the following the present invention will be described in greater detail on the basis of a preferred embodiment with reference to the accompanying drawings, in which.

DESCRIPTION OF THE PREFERRED EMBODIMENT

In the following, the preferred embodiment of the multiplexing and demultiplexing method and apparatus according to the present invention will be described on the basis of a UTOPIA interface for an ATM system.

The UTOPIA data path interface defines an interface between the physical layer (PHY) and upper layer modules such as the ATM layer and the corresponding management entities (such as a microprocessor or the like). In practice, the UTOPIA data path interface may, however, as well be used between two circuits which both belong to the ATM layer (i.e. ATM to ATM). In particular, the UTOPIA data path specification defines two interface signal groups i.e. transmit (Tx) and receive (Rx).

Figure 1:
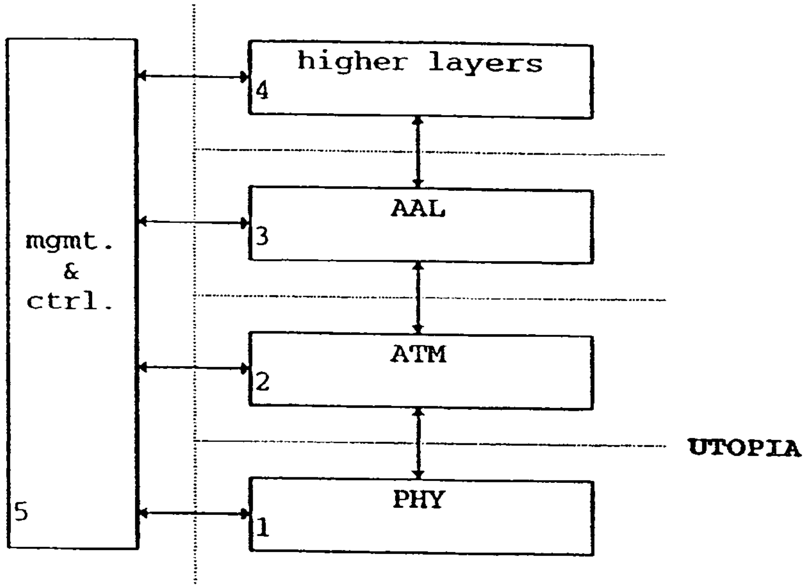
FIG. 1 is a principle block diagram of a basic ATM reference model.

FIG. 1 shows a basic ATM reference model comprising the UTOPIA interface. According to FIG. 1, three lower level layers are defined to implement the features of ATM. An ATM adaptation layer (AAL) 3 assures appropriate service characteristics and divides all types of data received from higher layers 4 into an 48 byte payload that will make up an ATM cell. Furthermore, an ATM adaptation layer 3 adds a 5 byte header information to the data to be transmitted, so as to assure that the ATM cell is transmitted on the right connection. A physical layer (PHY) 1 defines the electrical characteristics and network interfaces i.e. how the bits are transmitted via the wire. The above defined layers are controlled by a management & control function 5.

As shown in FIG. 1, the UTOPIA interface defines a standard interface between the ATM layer 2 and the PHY layer 1 of ATM subsystems. The interface part where data flows from the ATM layer 2 to the PHY layer 1 is labeled Transmit Interface, and the interface part where data flows from the PHY layer to the ATM layer is labeled Receive Interface.

Transmit and receive transfers are synchronized via the respective interface transfer clock. With an 8-bit data path and a maximum clock rate of 25 MHz, this interface supports rates from sub-100 to 155 Mbps. Furthermore, higher rates (e.g. 622 Mbps) may be supported by extending the data path to 16 bits and using a faster transfer clock.

The transfer of data is synchronized at the cell level via a Start Of Cell (SOC) signal. This signal is asserted when the data transfer path contains the first byte of a cell.

Given that the PHY layer 1 must accept transfer synchronizing clocks from the ATM layer 2, the PHY layer 1 will require rate matching buffers such as FIFOs. With the use of such FIFOs, flow control signals can be provided to allow both the ATM layer 2 and the PHY layer 1 to throttle the transfer rate.

The Receive Interface transfers data only when ATM layer 1 requests it by asserting an Enable signal. The interface also provides an Empty/Cell Available signal from the PHY layer 1 to allow a PHY layer rate control. A false Empty signal indicates a valid received octet and provides an octet-level flow control. A true Cell Available signal indicates the availability of a whole cell and provides a cell-level flow control.

The Transmit Interface transfers data only when the ATM layer 2 requests it by asserting an Enable signal. The interface also provides a Full/Cell Available signal from the PHY layer 1 to allow a PHY layer rate control. The Full signal is asserted if more than four additional bytes would cause a PHY buffer overflow. The Available signal indicates that enough space is left in the transmit FIFO to hold a complete cell.

Figure 2A:
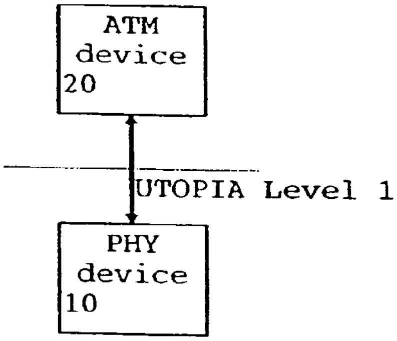
FIGS. 2A and 2B are respectively a block diagram of a UTOPIA level 1 reference configuration and a UTOPIA level 2 reference configuration.

In particular, the UTOPIA interface specification is divided into a Level 1 specification and a Level 2 specification. The UTOPIA Level 1 reference configuration is shown in FIG. 2A. According to the Level 1 reference configuration, one ATM device 20 is connected to one PHY device 10. Accordingly, the Level 1 specification specifies an 8 bit wide data path using an octet-level or a cell-level handshake, operating up to 25 MHz with a single PHY device, a cell format and extra signals for a 16-bit wide data path for future use.

Figure 2B:
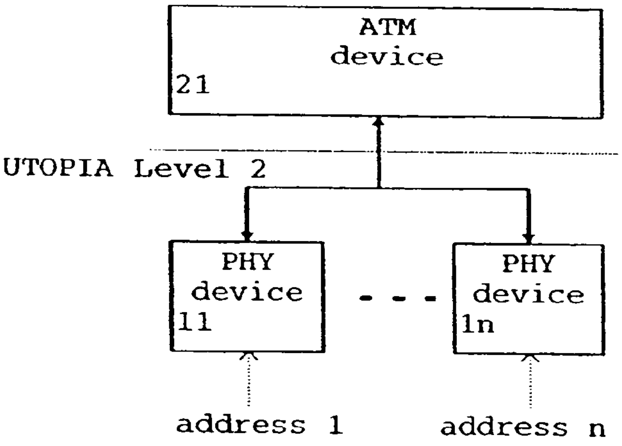

FIG. 2B shows a Level 2 reference configuration, wherein an ATM device 21 is connected to a plurality of PHY devices 11 to in, wherein n<8 for ATM layers 2 intended for 455 Mbps, and n<4 for ATM layers 2 intended for 622 Mbps. The virtual space is set up for n<31. According to FIG. 2B, addresses 1 to n are allocated by the management & control function 5 shown in FIG. 1.

In the following, the operation of the Transmit Interface, i.e. ATM→PHY, is briefly described.

In Level 1 UTOPIA, there is only one PHY device 10 and the control signal Empty/Cell Available is utilized to convey the transfer status to the ATM device 20. In Level 2 UTOPIA, only one of the PHY devices 11 to 1n at a time can be selected for a cell transfer. The ATM device 21 selects a PHY device by using a corresponding address. Once a PHY device is selected, the data transfer is accomplished by a handshake processing.

If a Level 2 PHY device is to be operated in a Level 1 PHY environment, the address of the Level 2 PHY device is set to a value programmed by the management & control function 5.

In the following, the Receive Interface is described.

In Level 1 UTOPIA, the signal Full/Cell Available is used to convey a transfer status to the ATM device 20. In Level 2 UTOPIA, only one of the PHY devices 11 to 1 n at a time is selected for a cell transfer. The ATM device 21 selects the PHY device by using the corresponding address. Once a PHY device is selected, the data transfer is accomplished by the handshake processing.

According to the preferred embodiment of the present invention, a UTOPIA multiplexer/demultiplexer and a method thereof is defined, to which a plurality of PHY devices can be connected via a UTOPIA Layer 1 interface and which can be connected to an ATM device via a UTOPIA Layer 1 or Layer 2 interface. Thus, a plurality of PHY devices can be connected to an ATM device by using a single address.

Figure 3:
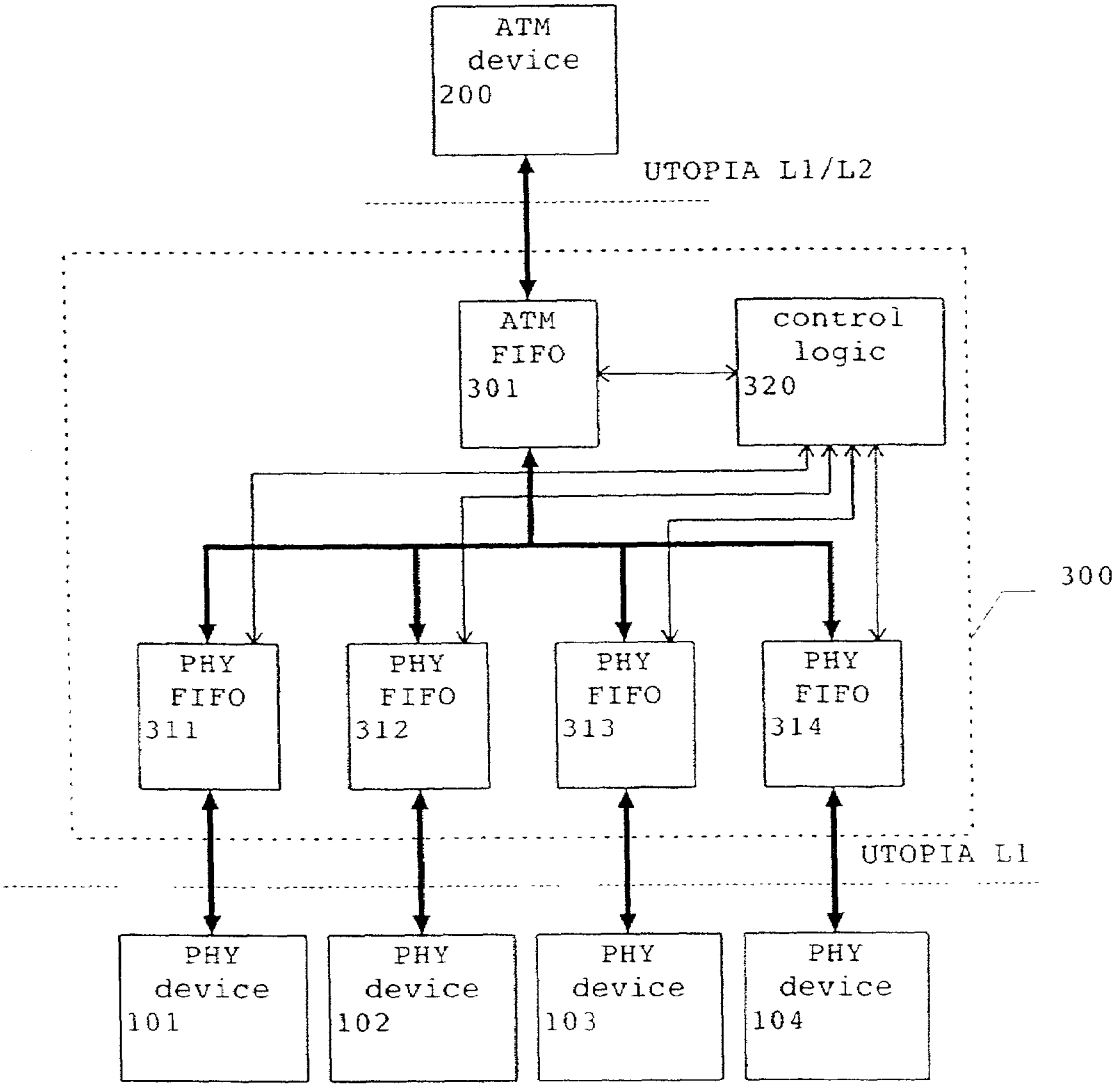
FIG. 3 is a block diagram of a multiplexer/demultiplexer according to the preferred embodiment of the present invention.

FIG. 3 shows a principle block diagram of the UTOPIA multiplexer/demultiplexer 300 according to the preferred embodiment of the present invention.

According to FIG. 3, the multiplexer/demultiplexer 300 comprises e.g. four FIFO buffers 311 to 314 at the PHY layer side. The PHY FIFO buffers 311 to 314 are respectively connected to Layer 1 PHY devices 101 to 104 via a UTOPIA Layer 1 interface. Furthermore, the multiplexer/demultiplexer 300 comprises a FIFO buffer 301 at the ATM layer side. The ATM FIFO 301 is connected to an ATM device 200 via a UTOPIA Layer 1 or Layer 2 interface.

However, it is to be noted that more or less than the above four PHY devices 101 to 104 and corresponding FIFO buffers 311 to 314 could be connected via the multiplexer/demultiplexer 300 to the ATM device 200, as well. Furthermore, if a Layer 1 interface is used, only one multiplexer/demultiplexer 300 can be connected to the ATM device 200. However, if a Layer 2 interface is provided, a plurality of multi-plexers/demultiplexers 300 can be connected to a single ATM device 200 by allocating corresponding addresses to the multiplexers/demultiplexers 300.

Furthermore, the multiplexer/demultiplexer 300 comprises a control logic 320 arranged to exchange control signals with the FIFO buffers 301 and 311 to 314, to thereby control the multiplexing/demultiplexing operation.

In the following, the operation of the multiplexer/demultiplexer 300 is described with reference to FIGS. 4A and 4B.

Figure 4A:
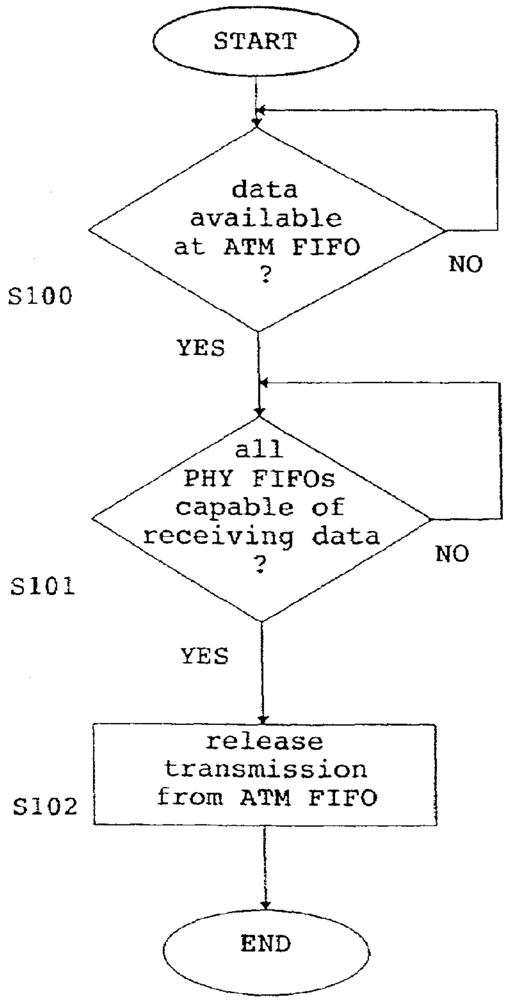
FIGS. 4A and 4B are respectively a flow diagram of a control operation of a transmit interface and of a receive interface, according to the preferred embodiment of the present invention.
Figure 4B:
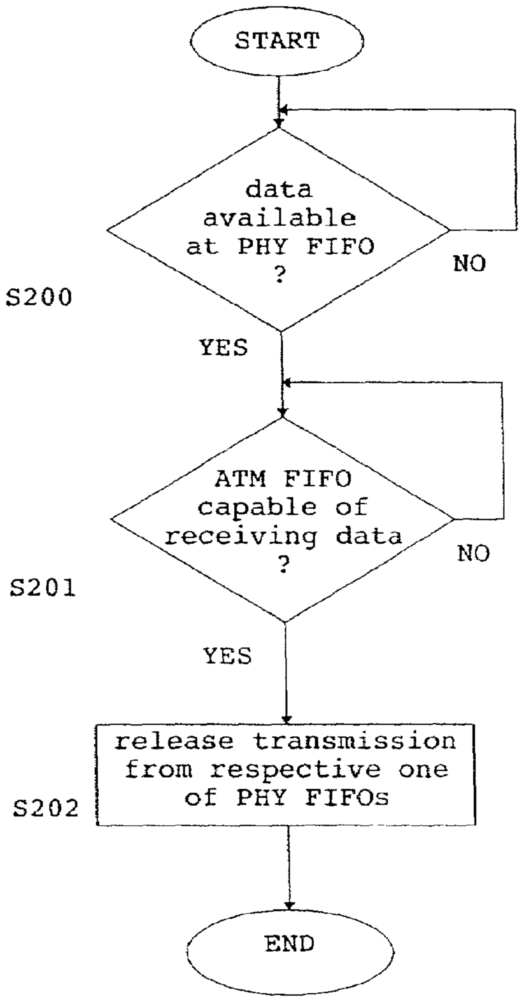

FIG. 4A shows a principle flow diagram of the demultiplexing processing, i.e. UTOPIA Transmit Interface function, performed by the control logic 320.

In case the ATM device 200 transmits an ATM cell or a data octet to one of the PHY devices 101 to 104, a Layer 1 or Layer 2 Transmit Interface data transfer to the ATM FIFO 301 is performed, as described above. The control logic 320 determines in step S100 whether data is available at the ATM FIFO 301. If not, step S100 is repeated until the control logic 320 receives a corresponding control signal from the ATM FIFO 301. Having received the transmitted data, the ATM FIFO 301 transmits a corresponding control signal to the control logic 320, and the processing of the control logic 320 moves to step S101 so as to determine whether all of the PHY FIFOs 311 to 314 have signalized their capability of receiving data, i.e. availability of empty buffer capacity. If not, step S101 is repeated until the control logic 320 receives a corresponding indication from all PHY FIFOs 311 to 314.

If enough buffer capacity is available at all PHY FIFOs 311 to 314, the control logic 320 issues a release signal to the ATM FIFO 301 to thereby release a transmission operation of the received data via an internal bus system to all of the PHY FIFOs 311 to 314 (step S102). In this respect, it is to be noted, that the internal bus interface between the ATM FIFO 301 and the PHY FIFOs 311 to 314 can be a usual FIFO interface or a UTOPIA Layer 1 interface with the corresponding processings.

Having received the transmitted data, the PHY FIFOs 311 to 314 perform a usual Layer 1 Transmit Interface data transfer to the PHY devices 101 to 104. The PHY devices 101 to 104 may then decide whether the data belongs to them, based on a corresponding information which may be provided in the UTOPIA cell format.

Thus, in the above described egress direction (ATM→PHY), the control logic 320 waits until all PHY FIFO buffers 311 to 314 can receive data, and then releases the ATM FIFO buffer 301 connected to the ATM device 200 to transmit data.

In the following, the multiplexing function i.e. Receive Interface data transfer, of the multiplexer/demultiplexer 300 according to the preferred embodiment is described with reference to FIG. 4B.

If one of the PHY devices 101 to 104 wishes to transmit an ATM cell or data octet to the ATM device 200, it performs a usual UTOPIA Receive Interface data transfer to the corresponding PHY FIFO via the UTOPIA Layer 1 interface.

Then, the control logic 320 waits in step S200 until the availability of the transmitted data at one of the PHY FIFOs 311 to 314 is signalized by a corresponding control signal. If so, the control logic 320 waits in step S201 until it has received a control signal from the ATM FIFO 301, which indicates that the ATM FIFO 301 is capable of receiving data, i.e. enough buffer capacity is available.

If the ATM FIFO 301 has indicated its capability of receiving data by a corresponding control signal, the control logic 320 issues in step S202 a released signal to the requesting PHY FIFO in order to release a data transmission from the respected one of the PHY FIFOs 311 to 314 to the ATM FIFO 301 via the internal bus system. Having received the transmitted data, the ATM FIFO 301 performs a usual UTOPIA Receive Interface data transfer to the ATM device 200 via the UTOPIA Layer 1 or Layer 2 interface, as described above.

Accordingly, in the above described ingress direction (PHY→ATM), the control logic 320 releases one of the PHY FIFO buffers 311 to 314 to transmit data, if the receiving ATM FIFO 301 is able to receive data. Thus, no data collisions will occur on the internal bus system.

It is to be noted that the above described multiplexer/demultiplexer 300 can be applied to any data network where an interface is to be established between a plurality of physical layer or higher layer devices and a higher layer device, to thereby reduce the number of required device addresses. In particular, the multiplexer/demultiplexer 300 according to the preferred embodiment may as well be used for connecting the ATM device 200 to a plurality of other ATM devices which may be UTOPIA level 1 or level 2 compliant. The control logic may be a hardware arrangement or a microprocessor controlled on the basis of a corresponding software program.

In summary, a multiplexing and demultiplexing method and apparatus are described, wherein a transmission of input data from one or a plurality of input buffers to a plurality of or one output buffer, respectively, is released when all of the plurality of or the one output buffer is capable of receiving data. Thus, a plurality of devices can be connected to another device using only one address. The plurality of devices may then decide themselves whether the data belongs to them or not. In one direction, the data is broadcasted to all of the plurality of devices and, in the other direction, one of the plurality of devices can transmit data at a time. Accordingly, interface addresses can be saved in case the number of addresses is not enough for all of the plurality of devices.

The above description of the preferred embodiment and the accompanying drawings are only intended to illustrate the present invention. The preferred embodiment of the invention may vary within the scope of the attached claims.

The invention claimed:

1. A method comprising:

providing an input buffer connected to an input channel and a plurality of output buffers respectively connected to a plurality of output channels connected to a plurality of physical protocol layer devices, allocating the same interface address to said plurality of physical protocol layer devices, storing input data received from said input channel in said input buffer, determining whether all of the output buffers have signalized their capability of receiving data, if not, repeating determining whether all of the output buffers have signalized their capability of receiving data until a corresponding indication of capability of receiving data has been received from all output buffers, releasing transmission of said input data from said input buffer to said plurality of output buffers, when all of said plurality of output buffers have signalized their capability of receiving data, and deciding, by the physical protocol layer devices themselves, whether the received data belongs to them.

2. The method according to claim 1, wherein said input and output buffers are first in first out buffers.

3. The method according to claim 2, wherein said plurality of physical protocol layer devices are universal test and operations physical layer for asynchronous transfer mode level 1 compliant.

4. The method according to claim 3, wherein said plurality of output channels are connected to a plurality of asynchronous transfer mode devices having the same interface address allocated.

5. The method according to claim 4, wherein said input channel is connected to an asynchronous transfer mode device.

6. The method according to claim 5, wherein said asynchronous transfer mode device is universal test and operations physical layer for asynchronous transfer mode level 1 or level 2 compliant.

7. The method according to claim 6, comprising:

using said output buffers as a plurality of input buffers respectively connected to said plurality of input channels;

using the input buffer as an output buffer connected to said output channel;

storing said received input data in a respective one of said plurality of input buffers; and releasing transmission of said input data from said respective one of said plurality of input buffers to said output buffer, when said output buffer is capable of receiving data.

8. The method according to claim 4, wherein said asynchronous transfer mode device is universal test and operations physical layer for asynchronous transfer mode level 1 or level 2 compliant.

9. The method according to claim 1, wherein said plurality of physical protocol layer devices are universal test and operations physical layer for asynchronous transfer mode level 1 compliant.

10. The method according to claim 1, wherein said plurality of output channels are connected to a plurality of asynchronous transfer mode devices having the same interface address allocated.

11. The method according to claim 1, wherein said input channel is connected to an asynchronous transfer mode device.

12. The method according to claim 1, comprising:

using said output buffers as a plurality of input buffers respectively connected to said plurality of input channels;

using the input buffer as an output buffer connected to said output channel;

storing said received input data in a respective one of said plurality of input buffers; and, releasing transmission of said input data from said respective one of said plurality of input buffers to said output buffer, when said output buffer is capable of receiving data.

13. An apparatus comprising:

an input channel configured to receive input data;

an input buffer configured to store said input data;

a plurality of output buffers configured to receive data from said input buffer respectively connected to a plurality of output channels, wherein said plurality of output channels are connected to a plurality of physical protocol layer devices having the same interface address allocated to each of said plurality of physical protocol layer devices; and a controller configured to determine whether all of the output buffers have signalized their capability of receiving data, configured to repeat the determination until a corresponding indication of the capability of receiving data has been received from all output buffers, and configured to release a transmission from said input buffer to said plurality of output buffers, when all of said plurality of output buffers have signalized their capability of receiving data;

wherein each of said plurality of physical protocol layer devices is configured to decide whether the received data belongs to them.

14. The apparatus according to claim 13, wherein said input and output buffer means are first in first out buffers.

15. The apparatus according to claim 14, wherein said controller is configured to receive a control signal indicating the receiving capability from anyone of said plurality of output buffers, and configured to supply a release signal to said input buffer, when said control signal has been received from all of said plurality of output buffers.

16. The apparatus according to claim 15, wherein said input channel is connected to an asynchronous transfer mode device.

17. The apparatus according to claim 16, wherein said asynchronous transfer mode device is universal test and operations physical layer for asynchronous transfer mode level 1 or level 2 compliant.

18. The apparatus according to claim 17, wherein said plurality of physical protocol layer devices are universal test and operations physical layer for asynchronous transfer mode level 1 compliant.

19. The apparatus according to claim 18, wherein said output channels are connected to a plurality of asynchronous transfer mode devices having the same interface address allocated.

20. The apparatus according to claim 14, comprising:

said plurality of output channels configured to serve as a plurality of input channels;

said input channel configured to serve as an output channel;

the plurality of output buffers configured to serve as a plurality of input buffers respectively connected to said plurality of input channels, wherein said input data is stored in a respective one of said plurality of input buffers; the input buffer configured to serve as an output buffer connected to said output channel;

the controller configured to release a transmission from said respective one of said plurality of input buffers to said output buffer, when said output buffer is capable of receiving data.

21. The apparatus according to claim 13, wherein said controller is configured to receive a control signal indicating the receiving capability from anyone of said plurality of output buffers, and to supply a release signal to said input buffer, when said control signal has been received from all of said plurality of output buffers.

22. The apparatus according to claim 13, wherein said input channel is connected to an asynchronous transfer mode device.

23. The apparatus according to claim 13, wherein said plurality of physical protocol layer devices are universal test and operations physical layer for asynchronous transfer mode level 1 compliant.

24. The apparatus according to claim 13, wherein said output channels are connected to a plurality of asynchronous transfer mode devices having the same interface address allocated.

25. The apparatus according to claim 13, comprising:

said plurality of output channels configured to serve as a plurality of input channels;

said input channel configured to serve as an output channel;

the plurality of output buffers configured to serve as a plurality of input buffers respectively connected to said plurality of input channels, wherein said input data is stored in a respective one of said plurality of input buffers; the input buffer configured to serve as an output buffer connected to said output channel;

the controller configured to release a transmission from said respective one of said plurality of input buffers to said output buffer, when said output buffer is capable of receiving data.

26. A system comprising:

the apparatus of claim 13; and at least one asynchronous transfer mode device;

wherein the apparatus of claim 13 is coupled to said at least one asynchronous transfer mode device.

27. An apparatus comprising:

means for receiving input data;

means for storing said input data;

means for receiving data from said means for storing said input data respectively connected to means for connecting to physical protocol layer means having the same interface address allocated to each of said physical protocol layer means;

means for determining whether all of the means for receiving said data from said means for storing said input data have signalized their capability of receiving said data, and for repeating said determining until a corresponding indication of the capability of receiving data has been received from all the means for receiving said data from said means for storing said input data; and means for releasing a transmission from said means for storing said input data to said means for receiving said data from said means for storing said input data, when all of said means for receiving data from said means for storing said input data have signalized their capability of receiving data;

wherein each of said physical protocol layer means is for deciding whether the received data belongs to them.

28. The apparatus according to claim 27, further comprising:

means for receiving a control signal indicating the receiving capability from anyone of said means for receiving data from said means for storing said input data; and means for supplying a release signal to said means for storing said input data, when said control signal has been received from all of said means for receiving data from said means for storing said input data.

* * * * *

UNITED STATES PATENT AND TRADEMARK OFFICE

CERTIFICATE OF CORRECTION

PATENT NO. : 7,215,673 B2
APPLICATION NO. : 10/006921
DATED : May 8, 2007
INVENTOR(S) : Kosonen et al.

It is certified that error appears in the above-identified patent and that said Letters Patent is hereby corrected as shown below:

In column 7, line 42, claim 7, line 8 after “and” --,-- should be inserted.
In column 8, line 53, claim 20, line 1 “14” should be --19--.

Signed and Sealed this

Fifteenth Day of July, 2008

JON W. DUDAS
*Director of the United States Patent and Trademark Office*